US012619331B2

(12) United States Patent
Shi et al.

(10) Patent No.: US 12,619,331 B2
(45) Date of Patent: May 5, 2026

(54) TOUCH CIRCUIT, TOUCH DETECTION AMPLIFYING CIRCUIT AND TOUCH APPARATUS

(71) Applicant: FOCALTECH SYSTEMS (SHENZHEN) CO., LTD., Shenzhen (CN)

(72) Inventors: Aihuan Shi, Shenzhen (CN); Jiannan Huang, Shenzhen (CN); Junqiao Liu, Shenzhen (CN)

(73) Assignee: FOCALTECH SYSTEMS (SHENZHEN) CO., LTD., Shenzhen (CN)

( * ) Notice: Subject to any disclaimer, the term of this patent is extended or adjusted under 35 U.S.C. 154(b) by 1 day.

(21) Appl. No.: 18/870,069

(22) PCT Filed: Feb. 8, 2023

(86) PCT No.: PCT/CN2023/075076
§ 371 (c)(1),
(2) Date: Nov. 27, 2024

(87) PCT Pub. No.: WO2023/226478
PCT Pub. Date: Nov. 30, 2023

(65) Prior Publication Data
US 2025/0370565 A1    Dec. 4, 2025

(30) Foreign Application Priority Data

May 27, 2022    (CN) .......................... 202210592108.9
Oct. 21, 2022    (CN) .......................... 202211297070.9

(51) Int. Cl.
*G06F 3/041*    (2006.01)
*G06F 3/044*    (2006.01)

(52) U.S. Cl.
CPC .......... *G06F 3/0418* (2013.01); *G06F 3/0446* (2019.05)

(58) Field of Classification Search
CPC ...... G06F 3/0418; G06F 3/0446; G06F 3/041; G06F 3/04166; G06F 3/044
See application file for complete search history.

(56) References Cited

U.S. PATENT DOCUMENTS

| | | | |
|---|---|---|---|
| 10,627,972 B2 * | 4/2020 | Chen ................... | G06F 3/04182 |
| 2010/0085322 A1 * | 4/2010 | Mamba ................ | G06F 3/0418 |
| | | | 345/173 |

(Continued)

FOREIGN PATENT DOCUMENTS

| | | |
|---|---|---|
| CN | 104216580 A | 12/2014 |
| CN | 106201122 A | 12/2016 |

(Continued)

*Primary Examiner* — Amy Onyekaba
(74) *Attorney, Agent, or Firm* — ScienBiziP, P.C.

(57) ABSTRACT

A touch circuit, a touch detection amplifying circuit, and a touch apparatus are provided, which include a charge generating circuit, a charging circuit, a controlling circuit, a touch detection amplifying circuit, and a data processing circuit. The charge generating circuit detects sensing capacitances. The controlling circuit controls the charging circuit to charge the charge generating circuit for decreasing an effect of a self-capacitor in the charge generating circuit in related to a sensing voltage outputted by the touch detection amplifying circuit. The touch detection amplifying circuit converts the sensing capacitance into the sensing voltage. The data processing circuit outputs a control signal based on the sensing voltage outputted by the touch detection amplifying circuit for adjusting a capacitance of the charging capacitor in the charging circuit or the common-mode capacitor in the touch detection amplifying circuit, thus the sensing voltage is in a valid signal range of a common-mode voltage.

26 Claims, 13 Drawing Sheets

(56)  References Cited

U.S. PATENT DOCUMENTS

| | | | |
|---|---|---|---|
| 2011/0109585 A1* | 5/2011 | Kwon | G06F 3/0445 |
| | | | 345/174 |
| 2015/0346879 A1* | 12/2015 | Jeong | G06F 3/0446 |
| | | | 345/174 |
| 2016/0103514 A1 | 4/2016 | He et al. | |
| 2016/0313862 A1* | 10/2016 | Mamba | G06F 3/0418 |
| 2017/0061188 A1 | 3/2017 | Kremin et al. | |
| 2017/0212635 A1 | 7/2017 | Cordeiro et al. | |
| 2018/0150157 A1* | 5/2018 | Fan | G06V 40/1365 |
| 2018/0173342 A1* | 6/2018 | Lee | G06F 3/044 |
| 2019/0171312 A1* | 6/2019 | Chen | G06F 3/044 |
| 2019/0204971 A1* | 7/2019 | Kang | G06F 3/0443 |
| 2019/0272056 A1* | 9/2019 | Wang | G01R 27/2605 |
| 2020/0081567 A1* | 3/2020 | Jiang | G06F 3/0446 |
| 2021/0033655 A1 | 2/2021 | Jiang | |

FOREIGN PATENT DOCUMENTS

| | | |
|---|---|---|
| CN | 114355057 A | 4/2022 |
| CN | 114528161 A1 | 5/2022 |
| CN | 114967977 A | 8/2022 |
| WO | 2021016992 A1 | 2/2021 |

* cited by examiner

200a

TOUCH CIRCUIT, TOUCH DETECTION AMPLIFYING CIRCUIT AND TOUCH APPARATUS

TECHNICAL FIELD

The present application generally relates to touch technology, and particular to a touch circuit, a touch detection amplifying circuit, and a touch apparatus.

BACKGROUND

According to the development of the smart phone, a capacitive touch detection is finding increasing. There are two directions of the capacitive touch detection solution, which are a self-capacitor detection and a mutual capacitance detection. The self-capacitor detection is by far more widely used. In a detection chip integrated with the touch and display together, the touch detection solution simply uses a self-capacitor solution, and in some detection solutions with mutual capacitance in major, an assistance detection with self-capacitor is also needed.

In the detection with self-capacitor, magnitude of charge is needed to be measured. In a circuit, the charge signal needs to be converted into voltage signal, thus, a charge amplifier (CA) circuit is needed for converting. However, during a process of manufacturing an integrated circuit, due to uncertainty of each process in a manufacture process, there is a mismatch between components with a same label. The mismatch of the components will change a valid signal range of the CA conversion, an accuracy of the CA is affected, and an apply environment is limited. A related technology mostly uses a method of increasing a size of the component, which will cause a waste in area, and an increase of capacitance of the circuit. Thus, a rate of the circuit is decreased and a dissipation of the circuit is increased.

SUMMARY

Based on above, it is necessary to provide a touch circuit, a touch detection amplifying circuit, and a touch apparatus, in order to solve the technology problems in a prior art of the valid signal range outputted by a touch detection amplifying circuit being affected by the difference of the component while manufacturing.

A touch circuit includes a charge generating circuit, a charging circuit, a controlling circuit, a touch detection amplifying circuit, and a data processing circuit. The charge generating circuit is configured to implement scan under a control of a specified timing for detecting sensing capacitances generated by sensing electrodes after being touched by a user. The controlling circuit is configured to control the charging circuit to charge or discharge the charge generating circuit. The touch detection amplifying circuit is electrically connected with the charging circuit and the controlling circuit. The charging circuit includes a charging capacitor. The charging capacitor is electrically connected with the controlling circuit and the touch detection amplifying circuit through a node. The touch detection amplifying circuit is configured to convert the sensing capacitance outputted by the charge generating circuit into a sensing voltage for identifying a touch operation and a touch position. The data processing circuit is configured to output a control signal based on the sensing voltage outputted by the touch detection amplifying circuit for adjusting a capacitance of the charging capacitor, which causes the sensing voltage outputted by the touch detection amplifying circuit in a valid signal range of a common-mode voltage.

A touch detection amplifying circuit, connected with a charge generating circuit. The touch detection amplifying circuit includes:

An amplifier, configured to convert a sensing capacitance outputted by the charge generating circuit into a sensing voltage; a first input terminal of the amplifier is electrically connected with the charge generating circuit;

A sampling module, configured to sample the voltage outputted by the amplifier and output a sampling voltage;

A reset switch, a terminal of the reset switch is electrically connected with the first input terminal of the amplifier, and another terminal of the reset switch is electrically connected with the output terminal of the amplifier;

A main capacitor, being connected between the first input terminal and the output terminal of the amplifier in series;

A plurality of assistance capacitors, a terminal of each assistance capacitor is electrically connected with the first input terminal of the amplifier through a first switch component, and another terminal of each of the plurality of the assistance capacitors is electrically connected with the output terminal of the amplifier through a second switch component; while the reset switch is turned on, and there is a difference between the sampling voltage and a target voltage, at least one of the plurality of the assistance capacitors is time multiplexed as a common-mode capacitor for storing charges, while the reset switch is turned off, at least one of the plurality of the assistance capacitors adjusts the voltage of the output terminal of the amplifier; while the reset switch is turned off, the first switch component and the second switch component of the assistance capacitors are turned on, the plurality of the assistance capacitors are served as access capacitors being connected with the main capacitor in series.

A common-mode parameter adjustment module, electrically connected with the sampling module; the common-mode parameter adjustment module sets at least one of plurality of the assistance capacitors to be time multiplexed as the common-mode capacitor by controlling at least one of the plurality of the first switch components to be turned on while there is a difference between the sampling voltage and the target voltage, and outputs a shift control signal;

A shift driving module, electrically connected with the common-mode parameter module, and electrically connected with each of the plurality of the assistance capacitors through a plurality of third switch components respectively; while the rest switch is turned on, the shift driving module is configured to control the plurality of the third switch components corresponding to the common-mode capacitors to be turned on, and charge the common-mode capacitors according to the shift control signal.

A touch apparatus includes a touch circuit; the touch circuit includes a charge generating circuit, a charging circuit, a controlling circuit, a touch detection amplifying circuit, and a data processing circuit. The charge generating circuit is configured to implement scan under a control of a specified timing for detecting sensing capacitances generated by sensing electrodes after being touched by a user. The controlling circuit is configured to control the charging circuit to charge or discharge the charge generating circuit.

The touch detection amplifying circuit is electrically connected with the charging circuit and the controlling circuit. The charging circuit includes a charging capacitor. The charging capacitor is electrically connected with the controlling circuit and the touch detection amplifying circuit through a node. The touch detection amplifying circuit is configured to convert the sensing capacitance outputted by the charge generating circuit into a sensing voltage for identifying a touch operation and a touch position. The data processing circuit is configured to output a control signal based on the sensing voltage outputted by the touch detection amplifying circuit for adjusting a capacitance of the charging capacitor, which causes the sensing voltage outputted by the touch detection amplifying circuit in a valid signal range of a common-mode voltage.

A touch apparatus includes a touch detection amplifying circuit connected with a charge generating circuit. The touch detection amplifying circuit includes:

An amplifier, configured to convert a sensing capacitance outputted by the charge generating circuit into a sensing voltage; a first input terminal of the amplifier is electrically connected with the charge generating circuit;

A sampling module, configured to sample the voltage outputted by the amplifier and output a sampling voltage;

A reset switch, an end of the reset switch is electrically connected with the first input terminal of the amplifier, and another end of the reset switch is electrically connected with an output terminal of the amplifier;

A main capacitor, being connected between the first input terminal and the output terminal of the amplifier in series;

A plurality of assistance capacitors, an end of each assistance capacitor is electrically connected with the first input terminal of the amplifier through a first switch component, and another terminal of each of the plurality of the assistance capacitors is electrically connected with the output terminal of the amplifier through a second switch component; while the reset switch is in a turn-on state, and there is a difference between the sampling voltage and a target voltage, at least one of the assistance capacitors is time multiplexed as a common-mode capacitor for storing charges, while the reset switch is in a turn-off state, at least one of the assistance capacitors adjusts the voltage of the output terminal of the amplifier. While the reset switch is in the turn-off state, the first switch component and the second switch component of the assistance capacitors are turned on, which causes the assistance capacitors served as access capacitors being connected with the main capacitor in series.

A common-mode parameter adjustment module, electrically connected with the sampling module; the common-mode parameter adjustment module sets at least one of the assistance capacitors to be time multiplexed as the common-mode capacitor by controlling at least one of the first switch component to be turned on while there is the difference between the sampling voltage and the target voltage, and outputs a shift control signal;

A shift driving module, electrically connected with the common-mode parameter module, and electrically connected with each of the plurality of the assistance capacitors through a plurality of third switch components respectively; while the rest switch is in the turn-on state, the shift driving module is configured to control the third switch components corresponding to the common-mode capacitors to be turned on, and charge the common-mode capacitors according to the shift control signal.

The foregoing touch circuit, the touch detection amplifying circuit, and the touch apparatus, according to an apply environment of the touch circuit, the data processing circuit adjusts the capacitance of the charging capacitor in the charging circuit or the capacitance of the common-mode capacitors in the touch detection amplifying circuit according to the sensing voltage, an adjustment of the sensing voltage of the output terminal of the amplifier in different manners and in different levels of precision is achieved, a voltage output range of the touch detection amplifying circuit is maximized used, a touch sensitive and a work rate of the touch detection amplifying circuit are improved.

DESCRIPTION OF SYMBOLS FOR MAIN COMPONENTS

Figure 1:
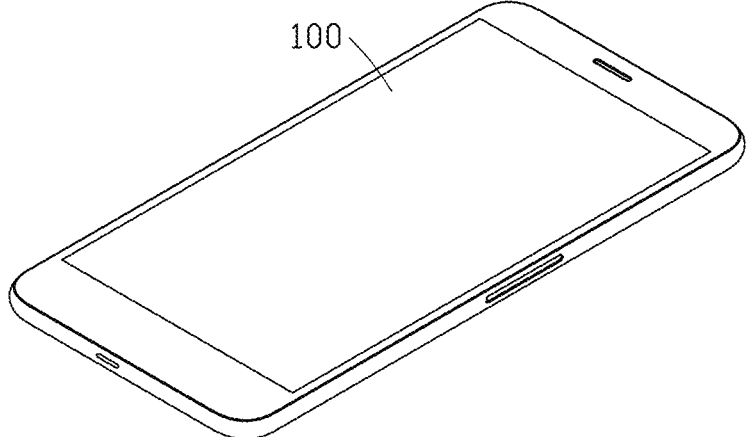
FIG. 1 is a schematic view of a touch apparatus of an exemplary embodiment of the present application.

| | |
|---|---|
| Touch apparatus | 100 |
| Touch circuit | 200, 200a, 200b, 200c |
| Charge generating circuit | 10 |
| Charging circuit | 20, 20a, 20b, 20c |
| Controlling circuit | 30 |
| Touch detection amplifying circuit | 40 |

-continued

| Data processing circuit | 50 |
|---|---|
| Sensing electrode | 12 |
| Self-capacitor | Csensor |
| Body capacitor | Cfinger |
| First control switch | φ11 |
| Second control switch | φ12 |
| Third control switch Ĩ | φ22 |
| Amplifier | 40 |
| Main capacitor | Ca |
| Reset switch | rst |
| Charging capacitor | Cb |
| First switch component | S1-1~S1-p |
| Second switch component | S2-1~S2-p |
| Sub-charging capacitor | Cb-1~Cb-p |
| Buffer | 21 |
| Node | N |
| Sensing voltage | Vout |
| Pulse voltage | Vtx |
| First current source | Ibp |
| Second current source | Ibn |
| Assistance capacitor | C1-1~C1-p |
| Third switch component | S3-1~S3-p |
| Sampling module | 43 |
| Common-mode parameter adjusting module | 45 |
| Shift driving module | 47 |

The present disclosure will be further described by the following specific embodiments in conjunction with the above figures.

DETAILED DESCRIPTION

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure.

In the description of the embodiments of the present disclosure, it is to be understood that the terms "connect" are broadly understood, unless otherwise expressly defined and defined. For example, it may be a fixed connection, either detachably connected or integrally connected. They may be mechanically connected, may also be electrically connected or may communicated with each other. They may directly connected or indirectly connected by intermediate media. They may be an internal connected between two elements or may be an interactive relationship between two elements. The specific meaning of the above term in embodiments of the present disclosure may be understood by ordinary skilled persons in the art according to a specific situation.

Terms "first", "second", and the like used in the specification, the claims, and the accompanying drawings of the present disclosure are used to distinguish different objects rather than describe a particular order. Besides, a term "comprise" and its variations are intended to cover a non-exclusive inclusion.

Unless otherwise specified, all technical and scientific terms have the ordinary meanings as understood by people skilled in the art. The terms used in this disclosure are illustrative rather than limiting.

A touch circuit, a touch detection amplifying circuit, and a touch apparatus of the following specific embodiments will further illustrate the present disclosure in conjunction with the above drawings.

Figure 2:
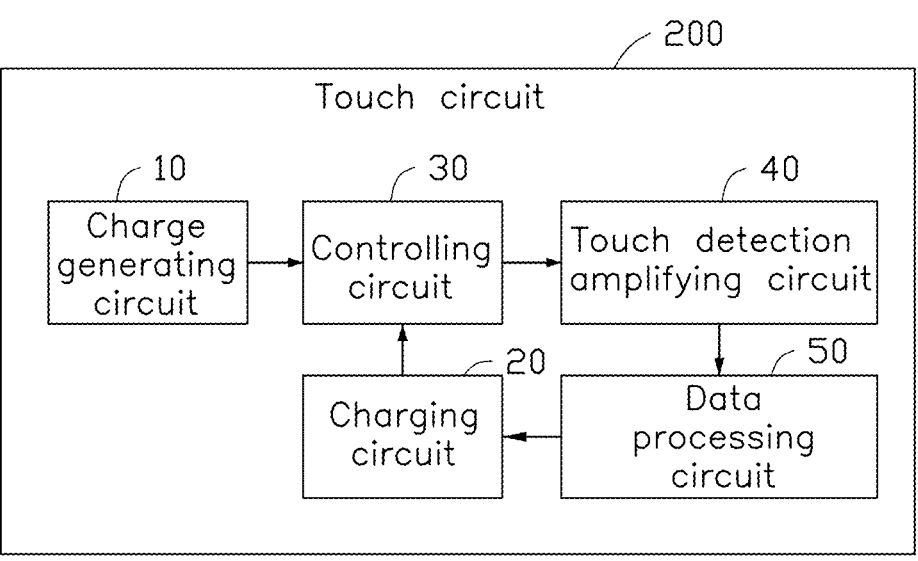
FIG. 2 is a schematic view of a touch circuit of FIG. 1 of an exemplary embodiment of the present application.

Referring to FIG. 1, FIG. 1 shows a schematic view of a touch apparatus 100 of an exemplary embodiment of the present application. In at least one embodiment of the present application, the touch apparatus 100 may be a removable device, such as a personal computer, a planet, a mobile phone, a personal digital assistance (PDA), a game machine, an Internet protocol television (IPTV), a smart wearable device, a navigation apparatus, and so on. The touch apparatus 100 may further include one or more functions, such as fingerprint identification function, a display function, and a camera function. The touch apparatus 100 includes a touch circuit 200 (as shown in FIG. 2). In one embodiment of the present application, the touch circuit 200 may include at least one integrated print circuit board, and a plurality of electrical components electrically connected with the at least one integrated print circuit board, such as capacitors, resistors, and chips, and so on.

Referring to FIG. 2 together, which is a schematic view of a touch circuit 200 of FIG. 1 of an exemplary embodiment. The touch circuit 200 includes a charge generating circuit 10, a charging circuit 20, a controlling circuit 30, a touch detection amplifying circuit 40, and a data processing circuit 50. In one embodiment of the present application, the touch apparatus 100 works under a specified voltage domain. The specified voltage domain is configured to limit a voltage variation range of the touch apparatus 100. The specified voltage domain defines a power source voltage VDD as an upper limit voltage and a ground voltage VSS as a lower limit voltage.

Figure 3:
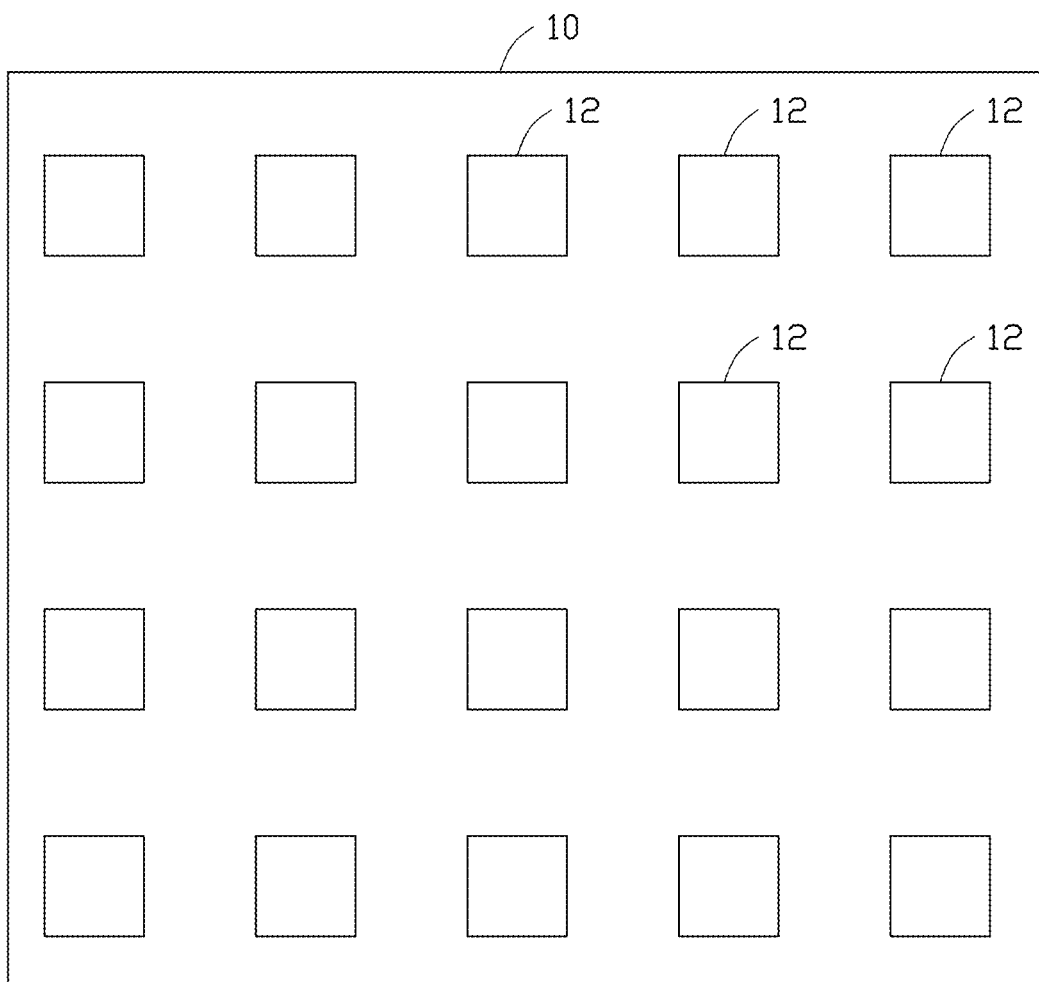
FIG. 3 is a schematic view of sensing electrodes of FIG. 2 of an exemplary embodiment of the present application.
Figure 4:
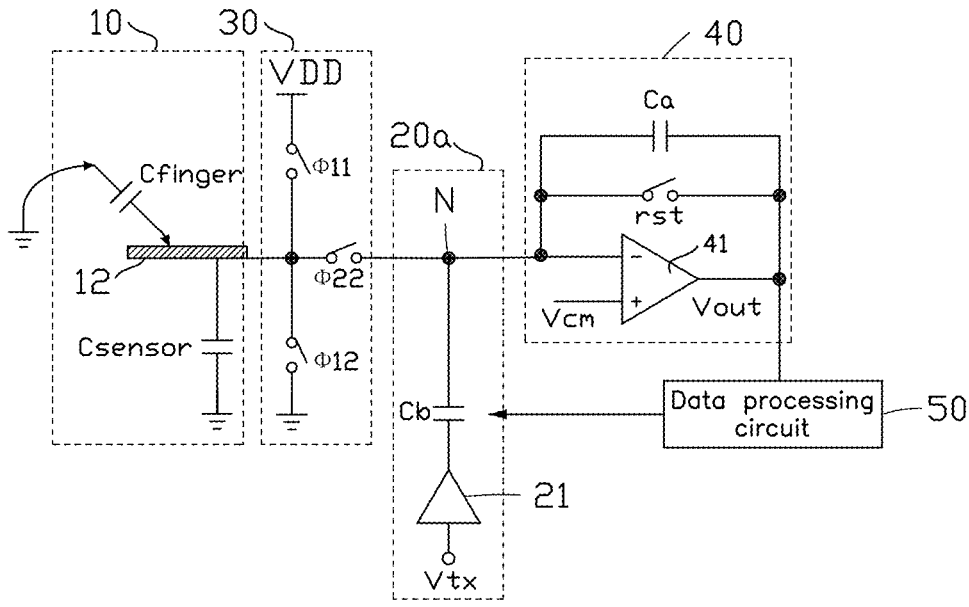
FIG. 4 is an equivalent circuit diagram illustrating a first embodiment of the touch circuit of FIG. 2.

The charge generating circuit 10 implements scanning under a control of a specified timing for detecting a sensing capacitance generated by sensing electrode after being touched by an user. As shown in FIG. 3, the charge generating circuit 10 includes sensing electrodes 12 arranged in a m*n matrix. In one embodiment, n and m are positive integers, which are the same or different from each other. Each sensing electrodes 12 forms a self-capacitor Csensor with ground (as shown in FIG. 4). When the user touches, the sensing electrodes 12 in a touched region form body capacitor Cfinger (as shown in FIG. 4) respectively. The self-capacitor Csensor and the body capacitor Cfinger are electrically connected in series to form a sensing capacitor. The sensing electrodes 12 are electrically connected with the touch detection amplifying circuit 40 through sensing lines (not shown).

In one embodiment of the present application, the touch apparatus 100 has a capacitance type touch panel. For the capacitance type touch panel, when human body does not touch the panel, the sensing capacitor corresponding to each sensing electrode 12 is the corresponding self-capacitor Csensor, and the self-capacitor Csensor serves as a standard capacitor. In that means, a capacitance of the capacitor of each sensing electrode 12 in related to ground is a fixed value. When the human body touches the panel, the sensing capacitor corresponding to each sensing electrode 12 is superimposed the self-capacitor Csensor with the corresponding body capacitor Cfinger. The touch detection amplifying circuit 40 determines a touch position by detecting a change of the capacitance of the sensing capacitor of each sensing electrodes 12 during a touch period. However, when the self-capacitor Csensor is larger, the change of the sensing capacitor in related to the self-capacitor Csensor is smaller. Therefore, during the touch period, the standard capacitor needs to be decreased or removed, for avoiding adverse effects while the touch detection.

Referring to FIG. 4 together, FIG. 4 is an equivalent circuit diagram illustrating a first embodiment of the touch circuit 200*a*. The charging circuit 20*a* is electrically connected with the charge generating circuit 10 and the controlling circuit 30. The charging circuit 20*a* is configured to charge the charge generating circuit 10 under the control of the controlling circuit 30. The charging circuit 20*a* is also configured to adjust a sensing voltage Vout outputted by the touch detection amplifying circuit 40 according to the controlling signal generated by the data processing circuit 50, which causes the sensing voltage Vout outputted by the touch detection amplifying circuit 40 in a valid signal range of a common-mode voltage. In that means, an effective voltage swing width of the sensing voltage Vout outputted by the touch detection amplifying circuit 40 is maximized. The valid signal range of the common-mode voltage is in the specified voltage domain. The sensing voltage Vout is a middle voltage level of the specified voltage domain, for achieving the maximum swing width in the specified voltage domain. For example, using the ground voltage VSS is 0V, and the power source voltage VDD is 1.5V of the specified voltage domain as an example, when the sensing voltage Vout is at 1.5V, the maximum swing width of which being swung upwardly and downwardly is 1.5V. In one embodiment of the present application, the valid signal range of a common-mode voltage is from 1.3V to 1.7V. In other embodiments of the present application, there are a plurality of valid signal ranges of the common-mode voltage in the touch apparatus 100, one of the valid signal ranges of the common-mode voltage is selected by the setting of the user for measuring the sensing voltage Vout.

Figure 5:
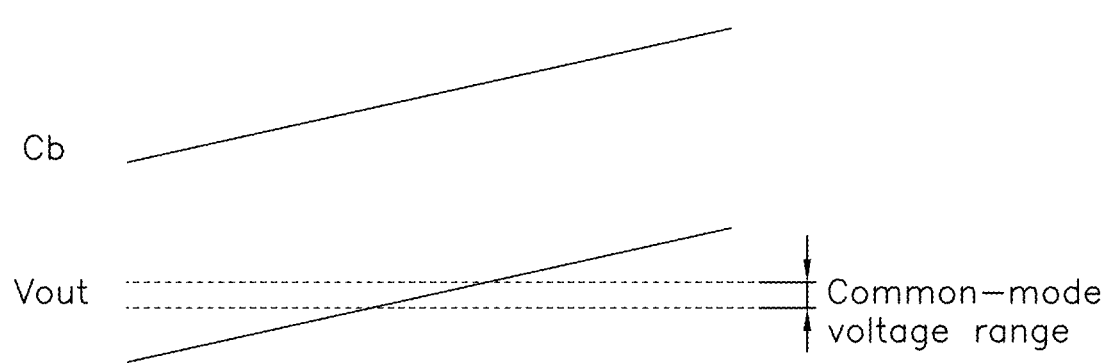
FIG. 5 is a schematic view of the change trend of the capacitance of the charging capacitor and the sensing voltage of FIG. 4.

Referring to FIGS. 2 and 4 together, the charging circuit 20*a* includes a charging capacitor Cb and a buffer 21. A terminal of the charging capacitor Cb is electrically connected with the sensing electrodes 12 through the node N and the controlling circuit 30, and is electrically connected with the touch detection amplifying circuit 40. Another terminal of the charging capacitor Cb is electrically connected with the buffer 21. The buffer 21 receives a pulse voltage Vtx. The charging capacitor Cb is charged or discharged according to the pulse voltage Vtx outputted by the buffer 21. A capacitance of the charging capacitor Cb is adjusted according to a correction signal outputted by the data processing circuit 50, for ensuring the sensing voltage Vout to be in the valid signal range of the common-mode voltage. In one embodiment of the present application, as shown in FIG. 5, the capacitance of the charging capacitor Cb changes with the sensing voltage Vout detected by the data processing circuit 50 in a direct proportional manner. That is, while the sensing voltage Vout intends to be increased, the capacitance of the charging capacitor Cb is increased according to the controlling signal outputted by the data processing circuit 50; while the sensing voltage Vout intends to be decreased, the capacitance of the charging capacitor Cb is decreased according to the controlling signal outputted by the data processing circuit 50.

Figure 6:
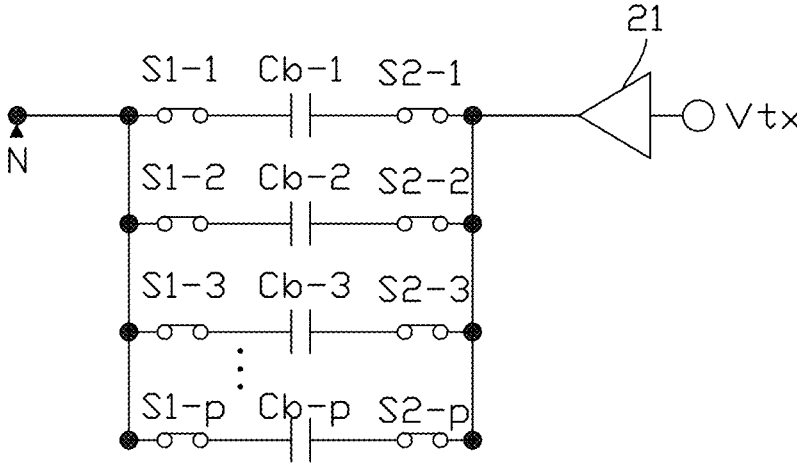
FIG. 6 is an equivalent circuit diagram of the charging capacitor of FIG. 4.

Referring to FIGS. 4 and 6, FIG. 6 is an equivalent circuit diagram of the charging capacitor Cb. The charging capacitor Cb includes a plurality of charging sub-capacitors Cb-1~Cb1-*p*, a plurality of first switch components S1-1~S1-*p*, and a plurality of second switch components S2-1~S2-*p*. In one embodiment, p is an integer being larger than 1. A terminal of each of the plurality of the charging sub-capacitors Cb-1~Cb-p is electrically connected with a first input terminal of an amplifier 41 through one of the first switch components S1-1~S1-*p*. Another terminal of each of the charging sub-capacitors Cb-1~Cb-p is electrically connected with the buffer 21 through one of the second switch components S2-1~S2-*p*. In a first embodiment of the present application, the charging sub-capacitors Cb-1~Cb-p are coded in binary format according to an arrangement order. The capacitances of the charging sub-capacitors Cb-1~Cb-p are different from each other, and are arranged in geometric progression with a geometric ratio. In one embodiment of the present application, while the correction signal is in unit of bit, at least one first switch component S1-*k* and the corresponding second component components S2-*k* are turned on according to the correction signal, which causes the corresponding charging sub-capacitor Cb-k to be served as the charging capacitor Cb. Thus, the capacitance of the charging capacitor Cb is adjusted in a manner of binary format. In one embodiment, k is an integer being less than p. For example, while the bit is 2, that is, the code in binary format is 010, thus, the first switch component S1-2 and the corresponding second switch component S2-2 are turned on according to the coded sequence, and the second charging sub-capacitor Cb-2 is selected and serves as the charging capacitor Cb. While the bit is 3, that is, the code in binary format is 011, thus, the first switch components S1-1~S1-2 and the corresponding second switch components S2-1~S2-2 are turned on according to the coded sequence, and the first and the second charging sub-capacitors Cb-1~Cb-2 are selected and serve as the charging capacitor Cb cooperatively. While the bit is 4, that is, the code in binary format is 100, thus, the first switch component S1-3 and the corresponding second switch component S2-3 are turned on according to the coded sequence, and the third charging sub-capacitor Cb-3 is selected and serves as the charging capacitor Cb. In other embodiments, each of the charging sub-capacitors Cb-1~Cb-p are coded in one-hot code format, and are controlled independently. The capacitance of each of the charging sub-capacitors Cb-1~Cb-p is the same. By controlling a number of the at least one of the first switch components S1-1~S1-*p* and the corresponding at least one of the second switch components S2-1~S2-*p* being turned on, the number of the charging sub-capacitor Cb-1~Cb-p are selected, for achieving adjusting the capacitance of the charging capacitor Cb in a one-hot code manner. For example, while the first switch components S1-1~S1-3 and the corresponding second switch components S2-1~S2-3 are turned on, the three charging sub-capacitors Cb-1~Cb-3 serve as the charging capacitor Cb cooperatively. While the first switch components S1-1~S1-4 and corresponding second switch components S2-1~S2-4 are turned on, the four charging sub-capacitors Cb-1~Cb-4 serve as the charging capacitor Cb cooperatively.

The controlling circuit 30 is electrically connected with the charge generating circuit 10, the charging circuit 20*a*, and the touch detection amplifying circuit 40. The controlling circuit 30 is configured to control the charging circuit 20*a* to charge or discharge the charge generating circuit 10 according to the power source voltage VDD and the ground voltage VSS, for decreasing the effect of the self-capacitor Csensor in related to the sensing voltage Vout outputted by the touch detection amplifying circuit 40. The controlling circuit 30 includes a first control switch φ11, a second control switch φ12, and a third control switch φ22. A terminal of the first control switch φ11 receives the power source voltage VDD, and another terminal of the first control switch is electrically connected with the sensing electrodes 12. A terminal of the second control switch φ12 is grounded, and another terminal of the second control switch φ12 is electrically connected with the sensing electrodes 12. A terminal of the third control switch φ22 is electrically connected with the sensing electrodes 12, and another terminal of the third control switch φ22 is electrically connected with the touch detection amplifying circuit 40 through the N node of the charging circuit 20a.

The touch detection amplifying circuit 40 is electrically connected with the controlling circuit 30 and the data processing circuit 50. The touch detection amplifying circuit 40 is configured to convert the capacitance of the sensing capacitor into a voltage signal, and output the sensing voltage Vout after amplified and integrated the voltage signal to the data processing circuit 50, which causes the data processing circuit 50 to process the sensing voltage Vout for determining whether the sensing electrode 12 is touched, and obtaining a touch position while being touched. The touch detection amplifying circuit 40 includes the amplifier 41, a main capacitor Ca, and a reset switch rst.

The amplifier 41 is electrically connected with the controlling circuit 30. The amplifier 41 is configured to convert capacitance of the sensing capacitor into a voltage signal, and output the sensing voltage Vout after amplified and integrated the voltage signal. A first input terminal of the amplifier 41 is electrically connected with the sensing electrodes 12 through the third control switch φ22, a second input terminal of the amplifier 41 receives a reference voltage Vcm, and the output terminal of the amplifier 41 is electrically connected with the data processing circuit 50. In one embodiment of the present application, the reference voltage Vcm is a half of the power source voltage VDD.

A terminal of the main capacitor Ca is electrically connected with the first input terminal of the amplifier 41, and another terminal of the main capacitor Ca is electrically connected with the output terminal of the amplifier 41.

A terminal of the reset switch rst is electrically connected with the first input terminal of the amplifier 41, and another terminal of the reset switch rst is electrically connected with the output terminal of the amplifier 41.

The data processing circuit 50 is electrically connected with the charging circuit 20a and the touch detection amplifying circuit 40. The data processing circuit 50 is configured to output the control signal according to the sensing voltage Vout, for adjusting the capacitance of the charging capacitor Cb of the charging circuit 20a, thus the sensing voltage Vout is adjusted. In one embodiment of the present application, the data processing circuit 50 convert the sensing voltage Vout to obtain the control signal by using an Analog-to-Digital converter (ADC).

Due to a bias voltage, it will cause the voltage of the first input terminal of the amplifier 41 to be shifted upwardly or downwardly, therefore the sensing voltage Vout outputted by the touch detection amplifying circuit 40 is out of the valid signal range of the common-mode voltage. In one embodiment of the present application, by adjusting the capacitance of the charging capacitor Cb in the charging circuit 20a according to a detection result generated by detecting the sensing voltage Vout by the data processing circuit 50, the sensing voltage Vout outputted by the touch detection amplifying circuit 40 has the maximum swing width in the valid signal range of the common-mode voltage is maintained.

In detail, the data processing circuit 50 detects the sensing voltage Vout outputted by the touch detection amplifying circuit 40 and determines whether a difference between the sensing voltage Vout and a predefined common-mode voltage is located in a predefined difference range. In one embodiment of the present application, the predefined common-mode voltage is located in the valid signal range of the common-mode voltage. For example, when the predefined common-mode voltage is 1.5V, and the valid signal range of the common-mode voltage is from 1.3V to 1.7V, the predefined difference range is from −0.2V to 0.2V. While the difference is located in the predefined difference range, it determines that the capacitance of the charging capacitor Cb does not need to be corrected, and the capacitance of the charging capacitor Cb is stored. While the difference is besides the predefined difference range, it is determined that the capacitance of the charging capacitor Cb needs to be corrected, the data processing circuit 50 adjusts the capacitance of the charging capacitor Cb according to the difference between the sensing voltage Vout and the predefined common-mode voltage. In one embodiment of the present application, while the difference is a positive value, the data processing circuit 50 outputs the controlling signal for decreasing the capacitance of the charging capacitor Cb; while the difference is a negative value, the data processing circuit 50 outputs the controlling signal for increasing the capacitance of the charging capacitor Cb.

Figure 7:
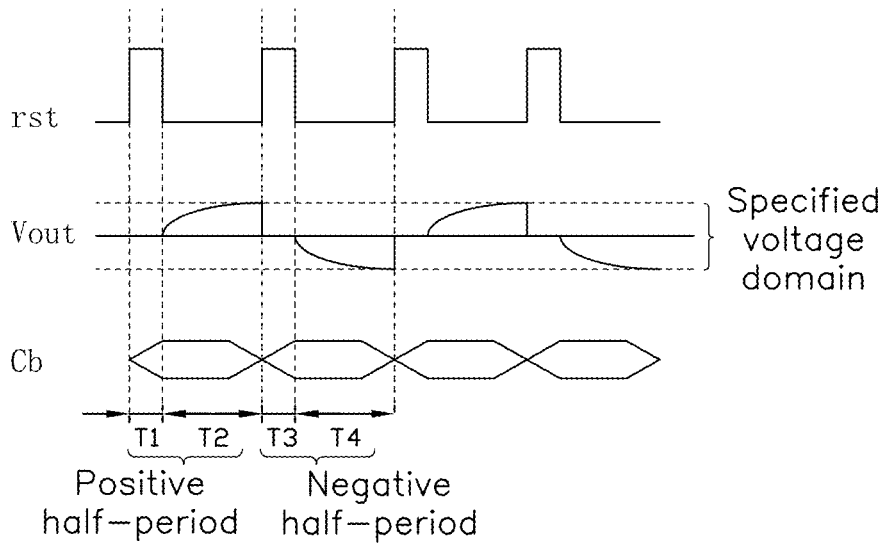
FIG. 7 is a schematic view of the waveforms of the reset switch, the sensing voltage, and the charging capacitor of FIG. 4.

Referring to FIG. 7, FIG. 7 shows the waveforms of the reset switch rst, the sensing voltage Vout, and the charging capacitor Cb. In one operation period, the touch detection amplifying circuit 40 detects the sensing electrode 12. In any one operation period, the touch apparatus 100 operates under a first period T1, a second period T2, a third period T3, and a fourth period T4 in that order. The first period T1 and the second period T1 form a positive half-period, and the third period T3 and the fourth period T4 form a negative half-period. In one embodiment of the present application, in the positive half-period, the data processing circuit 50 controls the capacitance of the charging capacitor Cb to be maintained at a predefined capacitance; in the negative half-period, the data processing circuit 50 controls the capacitance of the charging capacitor Cb to be adjusted according to the sensing voltage Vout. In other embodiments, in both of the positive half-period and the negative half-period, the data processing circuit 50 controls the capacitance of the charging capacitor Cb to be adjusted according to the sensing voltage Vout. The following describes the working principle of the touch apparatus 100 by using one operation period as an example.

Referring to FIG. 4, in the first period T1, the first control switch φ11 and the third control switch φ22 are turned off, the second control switch φ12 and the reset switch rst are turned on, the charge on the main capacitor Ca and the self-capacitor Csensor are discharged, for resetting the touch apparatus 100. Meanwhile, the buffer 21 outputs the ground voltage VSS to the charging capacitor Cb. The data processing circuit 50 sets the capacitance of the charging capacitor Cb in the charging circuit 20a at the predefined capacitance.

In the second period T2, the first control switch φ11, the third control switch φ22, and the reset switch rst are turned off, the second control switch φ12 is turned on, thus the self-capacitor Csensor is charged. Meanwhile, the buffer 21 outputs the power source voltage VDD to the charging capacitor Cb, the charging capacitor Cb discharges for charging the self-capacitor Csensor while there is no finger touch or charging the self-capacitor Csensor and the body capacitor Cfinger while the finger touch is present, thus the effect of the self-capacitor Csensor in related to the body capacitor Cfinger is decreased.

In the third period T3, the second control switch φ12 and the third control switch φ22 are turned off, the first control switch φ11 and the reset switch rest are turned on, thus, the power source voltage VDD charges the self-capacitor Csensor while there is no finger touch or charges the self-capacitor Csensor and the body capacitor Cbody while the finger touch is present, and the main capacitor Ca discharges. Meanwhile, the buffer 21 maintains the power source voltage VDD being provided to the charging capacitor Cb.

In the fourth period T4, the first control switch φ11, the second control switch φ12, and the reset switch rst are turned off, the third control switch φ22 are turned on, thus the self-capacitor Csensor discharges while there is no finger touch or the self-capacitor Csensor and the body capacitor Cbody discharge while the finger touch is present. The charge stored in the self-capacitor Csensor is transferred to the main capacitor Ca in the touch detection amplifying circuit 40. Meanwhile, the buffer 21 outputs the ground voltage VSS to the charging capacitor Cb again, and the charging capacitor Cb discharges for compensating the self-capacitor Csensor, thus the effect of the self-capacitor Csensor in related to the body capacitor Cbody is decreased. The data processing circuit 50 maintains the capacitance of the charging capacitor Cb at the predefined capacitance unchangeable.

Figure 8:
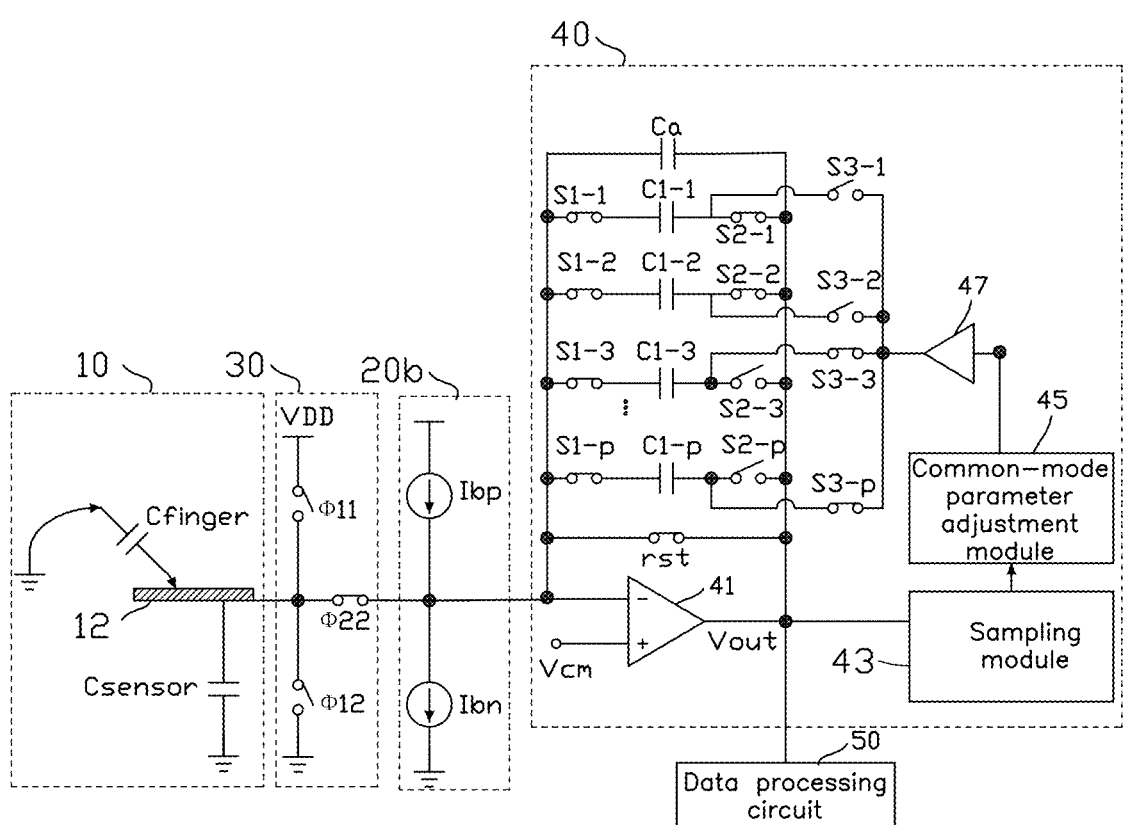
FIG. 8 is an equivalent circuit diagram of the second embodiment of the touch circuit in the first period or the third period of FIG. 2.

Referring to FIG. 8, FIG. 8 shows an equivalent circuit diagram of a second embodiment of the touch circuit 200b in the first period T1 or the third period T3.

The charging circuit 20b in the touch circuit 200b of the second embodiment includes a first current source Ibp and a second current source Ibn. The first current source Ibp provides a first charging current, and the second current source Ibn provides a second charging current.

The controlling circuit 30 is electrically connected with the charge generating circuit 10, the charging circuit 20b, and the touch detection amplifying circuit 40. The controlling circuit 30 is configured to control the charging circuit 20b to charge or discharge the charge generating circuit 10, for decreasing the effect of the self-capacitor Csensor in related to the sensing voltage Vout outputted by the touch detection amplifying circuit 40. The controlling circuit 30 operates under the first period T1, the second period T2, the third period T3, and the fourth period T4 in that order. In the first period T1, the controlling circuit 30 establishes an electrical connection between the charge generating circuit 10 and the charging circuit 20b, and controls the power source voltage Vdd to charge the self-capacitor Csensor. In the second period T2, the controlling circuit 30 establishes the electrical connection between the electrical connection between the charge generating circuit 10 and the charging circuit 20b, and controls the first current source Ibp to charge the self-capacitor Csensor, for decreasing the effect of the self-capacitor Csensor in related to the body capacitor Cfinger. The charging capacitor Cb discharges and the charge on the self-capacitor Csensor and the body capacitor Cfinger are transferred to the touch detection amplifying circuit 40. In the third period T3, the controlling circuit 30 cuts off the electrical connection between the charge generating circuit 10 and the charging circuit 20b, and controls the self-capacitor Csensor to discharge. In the fourth period T4, the controlling circuit 30 establishes the electrical connection between the charge generating circuit 10 and the charging circuit 20b, and controls the second current power Ibn to charge the self-capacitor Csensor, for decreasing the effect of the self-capacitor Csensor in related to the body capacitor Cfinger. Meanwhile, the charge stored in the capacitor of the touch detection amplifying circuit 40 is transferred to the self-capacitor Csensor. The controlling circuit 30 includes the first control switch φ11, the second switch φ12, and the third control switch φ22. The terminal of the first control switch φ11 receives the power source voltage VDD, and the another terminal of the first control switch φ11 is electrically connected with the sensing electrodes 12. The terminal of the second control switch φ12 is grounded, and the another terminal of the second control switch φ1 is electrically connected with the sensing electrodes 12. The terminal of the third control switch φ22 is electrically connected with the sensing electrodes 12, and the another terminal of the third control switch 22 is electrically connected with the charging circuit 20b and the touch detection amplifying circuit 40.

The touch detection amplifying circuit 40 is electrically connected with the controlling circuit 30 and the data processing circuit 50. The touch detection amplifying circuit 40 is configured to convert the capacitance of the sensing capacitor into a voltage signal, and output the sensing voltage Vout after amplified and integrated the voltage signal to the data processing circuit 50, which causes the data processing circuit 50 to process the sensing voltage Vout for determining whether the sensing electrode 12 is touched, and obtaining a touch position while being touched. Further, the touch detection amplifying circuit 40 may adjust the sensing voltage Vout in the specified voltage domain. The specified voltage domain is configured to limit a voltage variation range of the touch apparatus 100. The specified voltage domain defines the power source voltage VDD as the upper limit voltage and the ground voltage VSS as the lower limit voltage. The power source voltage VDD also serves as the working voltage of the touch apparatus 100, and the ground voltage VSS also serves as the ground voltage.

Figure 9:
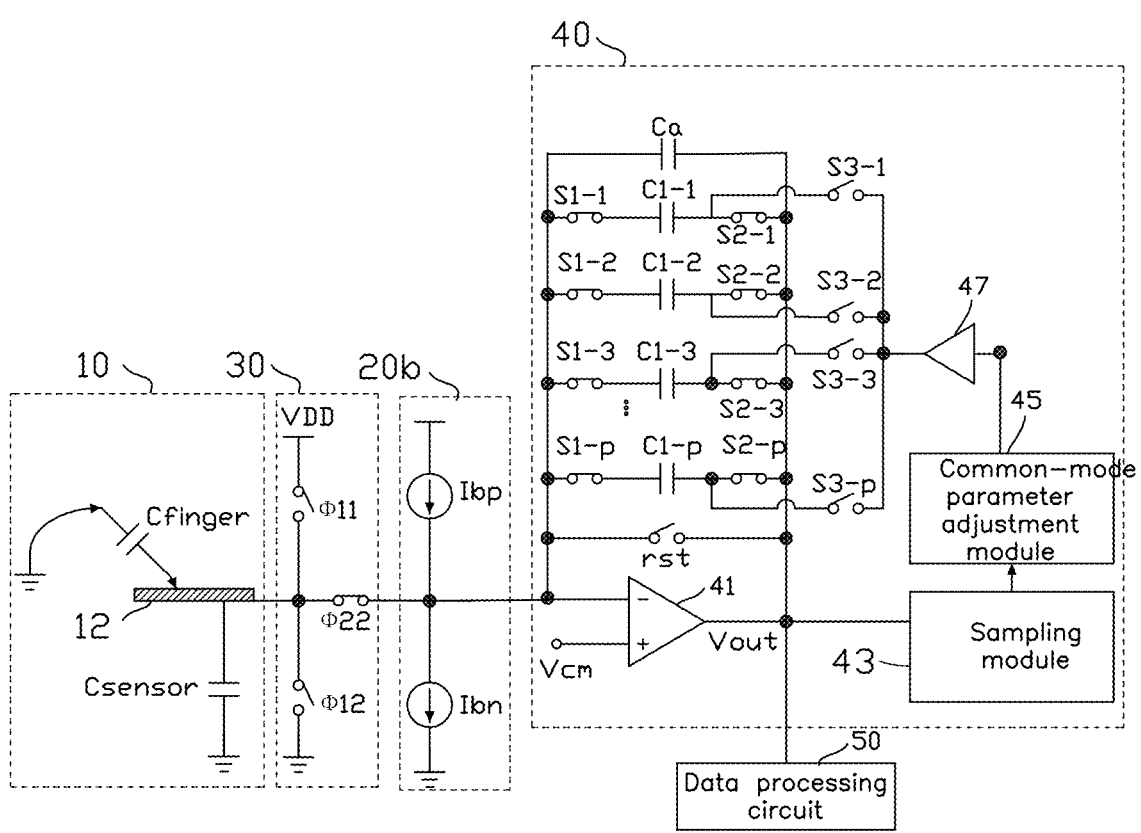
FIG. 9 is an equivalent circuit diagram of the second embodiment of the touch circuit in the second period or the fourth period of FIG. 8.

Referring to FIGS. 8 and 9, the touch detection amplifying circuit 40 includes the amplifier 41, the main capacitor Ca, the reset switch rst, a plurality of assistance capacitors C1-1~C1-P, the plurality of first switch components S1-1~S1-$p$, the plurality of second switch components S2-1~S2-$p$, a plurality of third switch components S3-1~S3-$p$, a sampling module 43, a common-mode parameter adjusting module 45, and a shift driving module 47. In one embodiment, p is an integer being larger than 1. In other embodiments, the sampling module 43, the common-mode parameter adjusting module 45, and the shift driving module 47 may be integrated the data processing circuit 50.

The amplifier 41 is electrically connected with the controlling circuit 30. The amplifier 41 is configured to convert capacitance of the sensing capacitor into a voltage signal, and output the sensing voltage Vout after amplified and integrated the voltage signal. The first input terminal of the amplifier 41 is electrically connected with the sensing electrodes 12 through the third control switch φ22, the second input terminal of the amplifier 41 receives a reference voltage Vcm, and the output terminal of the amplifier 41 is electrically connected with the data processing circuit 50. In one embodiment of the present application, the reference voltage Vcm is a half of the power source voltage VDD.

The terminal of the main capacitor Ca is electrically connected with the first input terminal of the amplifier 41, and the another terminal of the main capacitor Ca is electrically connected with the output terminal of the amplifier 41.

The terminal of the reset switch rst is electrically connected with the first input terminal of the amplifier 41, and the another terminal of the reset switch rst is electrically connected with the output terminal of the amplifier 41. As shown in FIG. 8, the reset switch rst is turned on in the first period T1 and the third period T3. As shown in FIG. 9, the reset switch rst is turned off in the second period T3 and the fourth period T4.

A terminal of each of the assistance capacitors C1-1~C1-$p$ is electrically connected with a first input terminal of the amplifier 41 through a corresponding one of the first switch components S1-1~S1-*p*. The another terminal of each of the assistance capacitors C1-1~C1-*p* is electrically connected with the amplifier 41 through a corresponding one of the second switch components S2-1-S2-*p*, and is electrically connected with the shift driving module 47 through a corresponding one of the third switch components S3-1~S3-*p*. The plurality of the assistance capacitors C1-1~C1-P serves as access capacitors while the reset switch rst is turned off and transfers the charge, for adjusting the voltage of the output terminal of the amplifier 41 upwardly or downwardly. At least one of the plurality of the assistance capacitors C1-1~C1-*p* serves as a common-mode capacitor while the reset switch rst is turned on, for discharging the stored charge, thus the sensing voltage Vout is adjusted. In one embodiment, the plurality of the assistance capacitors C1-1~C1-*p* are coded in binary format according to an arrangement order. The capacitances of each of the plurality of the assistance capacitors C1-1~C1-*p* are different from each other, and are arranged in geometric progression with a geometric ratio. At least one of the plurality of the third switch components S3-1-S3-*p* are turned on by setting the bit, at least one of the plurality of the assistance capacitors C1-*k* serves as the common-mode capacitor, the common-mode capacitors are selected in a manner of binary format. In one embodiment, k is an integer being less than p. For example, when the bit is 2, that is, the code in binary format is 010, thus, the third switch component S3-2 is turned on according to the coded sequence for selecting the second assistance capacitor C1-2 as the common-mode capacitor. While the bit is 3, that is, the code in binary format is 011, thus, the third switch components S3-1~S3-2 are turned on according to the coded sequence for selecting the first and the second assistance capacitors C1-1~C1-2 as the common-mode capacitors cooperatively. While the bit is 4, that is, the code in binary format is 100, thus, the third switch component S3-3 is turned on according to the coded sequence for selecting the third assistance capacitor C1-3 as the common-mode capacitor. In other embodiments, each of the plurality of the assistance capacitors C1-1~C1-*p* are coded in one-hot code format, and are controlled independently. The capacitance of each of the plurality of the assistance capacitors Cb-1~Cb-p is same. By controlling a number of at least one of the third switch components S3-1~S3-*p* being turned on, the number of the assistance capacitor C1-1~C1-*p* served as the common-mode capacitors are selected, for selecting the common-mode capacitor in a one-hot code manner. For example, while the third switch components S3-1-S3-3 are turned on, the three assistance capacitors C1-1~C1-3 serve as the common-mode capacitor cooperatively. While the third switch components S3-1~S3-4 are turned on, the four assistance capacitors C1-1~C1-4 serve as the common-mode capacitors cooperatively.

The sampling module 43 is electrically connected with the output terminal of the amplifier 41. The sampling module 43 is configured to sample the sensing voltage Vout and output a sampled voltage to the common-mode parameter adjusting module 45. In one embodiment of the present application, the sampling module 43 uses the ADC to sample.

The common-mode parameter adjusting module 45 is electrically connected with the sampling module 43 and the shift driving module 47. The common-mode parameter adjusting module 45 is configured to set the number of the assistance capacitors C1-1~C1-*p* serving as the common-mode capacitors according to the sampling voltage and a target voltage. The target voltage is a specified common-mode voltage of the amplifier 41.

In detail, the common-mode parameter adjusting module 45 uses a difference between the sampled voltage and the target voltage as a shifted value, calculates a capacitance of the common-mode capacitor based on the shifted value and the capacitance of the access capacitors, and obtains a value of the bit corresponding to the capacitance of the common-mode capacitor by table look-up, for adjusting the number of the assistance capacitor C1-1~C1-*p* serving as the common-mode capacitors. The capacitance of the common-mode voltage is calculated by the following formular.

$$Cp = \mathrm{V}diff/\mathrm{V}t * Cfb \qquad \text{Formular 1}$$

Wherein, Cp represents the capacitance of the common-mode capacitor, Vdiff represents the difference between the sampled voltage and the target voltage, Cfb represents a sum of the capacitance of the access capacitors. In one embodiment of the present application, the target voltage is a half of the power source voltage VDD.

The common-mode parameter adjusting module 45 stores a look-up table. The look-up table records a relationship between different capacitances of the common-mode capacitor and different bits.

Figure 12:
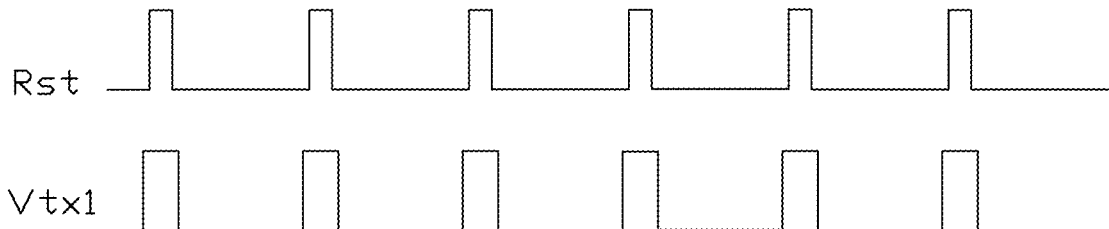
FIG. 12 is a schematic view of waveforms of the reset switch and the first shift control signal of FIG. 11.
Figure 13:
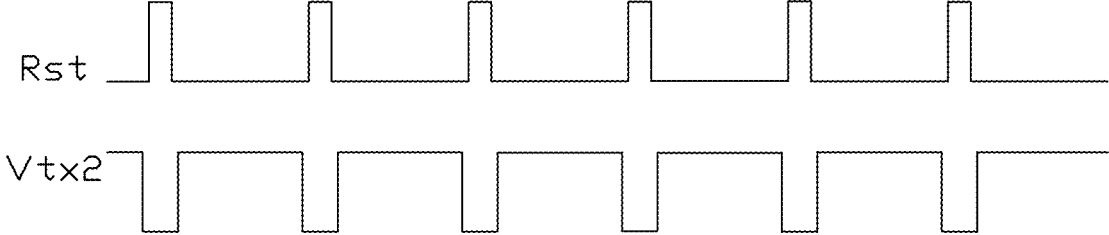
FIG. 13 is a schematic view of waveforms of the reset switch and the second shift control signal of FIG. 11.

Further, the common-mode parameter adjusting module 45 compares the sampled voltage and the target voltage and outputs a shift control signal based on a comparison result, for confirming a shifting direction. While the sampled voltage is larger than the target voltage, it is determined that the voltage of the output terminal of the amplifier 41 is too high, the common-mode parameter adjusting module 45 outputs a first shift control signal, for adjusting the voltage of the amplifier 41 downwardly. While the sampled voltage is less than the target voltage, it is determined that the voltage of the output terminal of the amplifier 41 is too low, the common-mode parameter adjusting module 45 outputs a second shift control signal, for shifting the voltage of the output terminal of the amplifier 41 upwardly. In one embodiment of the present application, the first shift control signal is a ground voltage GND, the second shift control signal is the power source voltage VDD. In the second embodiment of the present application, as shown in FIGS. 12 and 13, the first shift control signal Vtx1 and the second shift control signal Vtx2 are pulse signals of same frequency and opposite in phase. The first shift control signal Vtx1 and the controlling signal of the reset switch rst are pulse signals of same frequency and same phase; the second controlling signal Vtx2 and the controlling signal of the reset switch rst are pulse signals of same frequency and opposite in phase.

The shift driving module 47 is electrically connected with the common-mode parameter adjusting module 45, and are electrically connected with the plurality of the assistance capacitors C1-1~C1-*p* through the corresponding the plurality of the third switch components S3-1~S3-*p* respectively. The shift driving module 47 is configured to control the first switch component S1-1~S1-*p* and the third switch component S3-1~S3-*p* corresponding to the common-mode capacitor to be turned on while the reset switch rst is turned on and there is the difference between the sampled voltage and the target voltage, and provide the first shift control signal and the second shift control signal to the common-mode capacitor.

Figure 10:
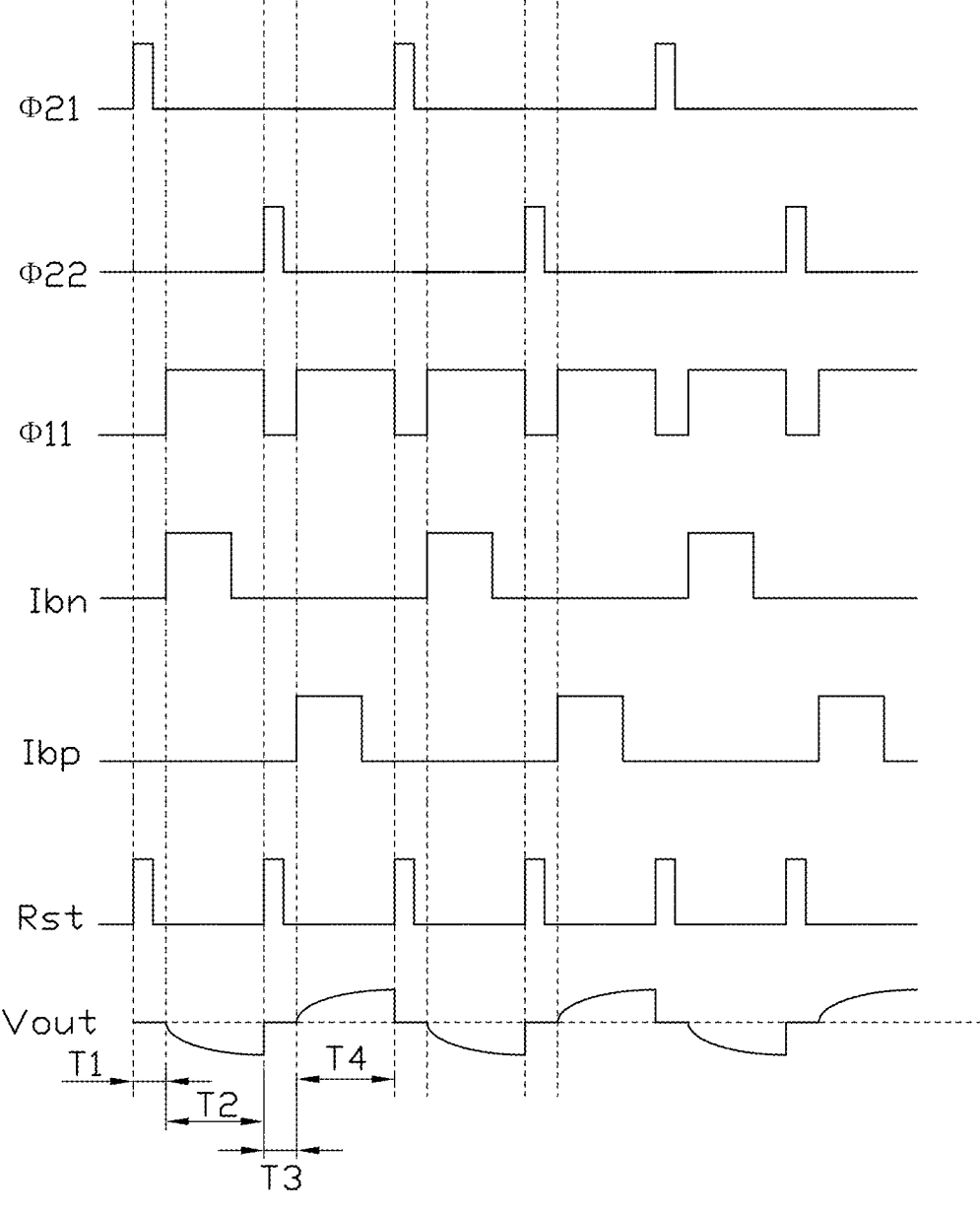
FIG. 10 is a schematic view of waveforms of the first control switch, the second control switch, the third control switch, the pulse voltage, the reset switch and the sensing voltage of FIG. 8.

Referring to FIGS. 9 and 10, FIGS. 9 and 10 are waveforms of the first control switch φ11, the second control switch φ12, the third control switch φ22, the first current source Ibp, the second current source Ibn, the reset switch rst, and the sensing voltage Vout.

The working principle of the touch detection amplifying circuit 40 is described as following.

In the first period T1, the first control switch φ11 is turned on, the second control switch φ12 and the third control switch φ22 are turned off. Meanwhile, the reset switch rst is turned on, the charge on the main capacitor Ca and the assistance capacitors C1-1~C1-p are discharged.

In the second period T2, the first control switch φ11 and the second control switch φ 12 are turned off, the third control switch φ22 is turned on. Meanwhile, the reset switch rst is turned off, the charge on the body capacitor Cfinger is transferred to the main capacitor Ca and the assistance capacitor C1-1~C1-p. The amplifier 41 converts the charge on the body capacitor Cfinger into the voltage signal and outputs through the output terminal. At the same time, the sampling module 43 samples the voltage outputted by the output terminal of the amplifier 41 and outputs the sampled voltage to the common-mode parameter adjusting module 45. The common-mode parameter adjusting module 45 calculates the shift capacitance based on the sampled voltage, the target voltage, and the capacitance of the access capacitors. When the shift capacitance is 0, the common-mode parameter module 45 determines that the assistance capacitors does not need to be accessed. When the shift capacitance is not 0, the common-mode parameter adjusting module 45 obtains the value of the bit by table look-up, for setting the number of the assistance capacitors C1-1~C1-p serving as the common-mode capacitors. In one embodiment of the present application, the smaller the shift capacitance is, the smaller capacitance of the common-mode capacitor set by the common-mode parameter adjusting module 45 is.

In the third period T3, the second control switch φ12 is turned on, the first control switch φ11 and the third control switch φ22 are turned off. Meanwhile, the reset switch rst is turned on. The shift driving module 47 provides the first shift control signal or the second shift control signal to the common-mode capacitor, for charging the common-mode capacitor.

In the fourth period T4, the first control switch φ11 and the second control switch φ 12 are turned off, the third control switch φ22 is turned on. Meanwhile, the reset switch rst is turned off. At this time, the charge stored on the common-mode capacitors are transferred to the main capacitor Ca, for adjusting the voltage of the output terminal of the amplifier 41 upwardly or downwardly.

Based on the foregoing touch circuit 200b, by setting the plurality of the assistance capacitors C1-1~C1-p connected in series and adjusting the voltage of the output terminal of the amplifier 41 in the time multiplexed manner, the output range of the voltage of the touch detection amplifying circuit 40 is maximumly used for improving a sensitivity and a work rate of the touch detection amplifying circuit 40.

Figure 11:
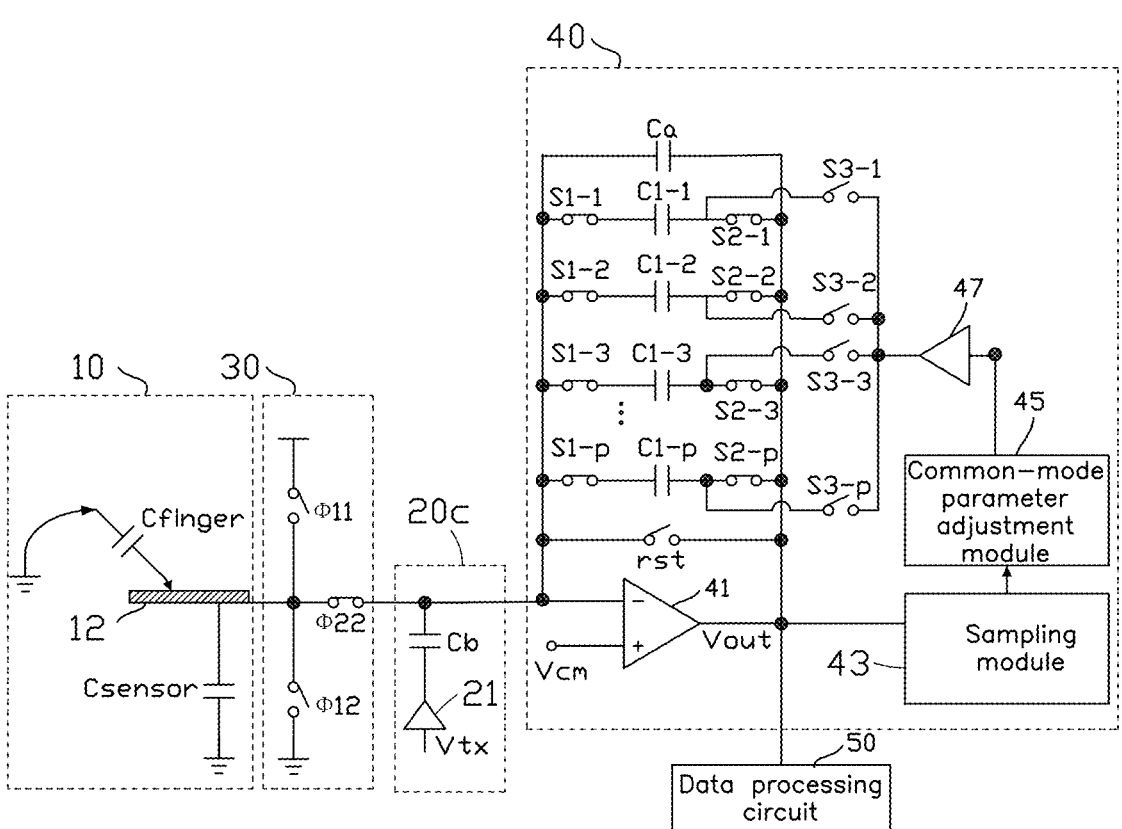
FIG. 11 is an equivalent circuit diagram of a third embodiment of the touch circuit of FIG. 2.

Referring to FIG. 11 together, FIG. 11 shows an equivalent circuit diagram of a third embodiment of the touch circuit 200c. The touch circuit 200c is basically the same as the touch circuit 200b. In other words, the description of the touch circuit 200b of the second embodiment is suitable used to the touch circuit 200c of the third embodiment, the difference is that the structure of the charging circuit 20c.

The charging circuit 20c includes the charging capacitor Cb and the buffer 21. The terminal of the charging capacitor Cb is electrically connected with the sensing electrodes 12, and the another terminal of the charging capacitor Cb is electrically connected with the buffer 21. The buffer 21 receives a pulse voltage Vtx.

Figure 14:
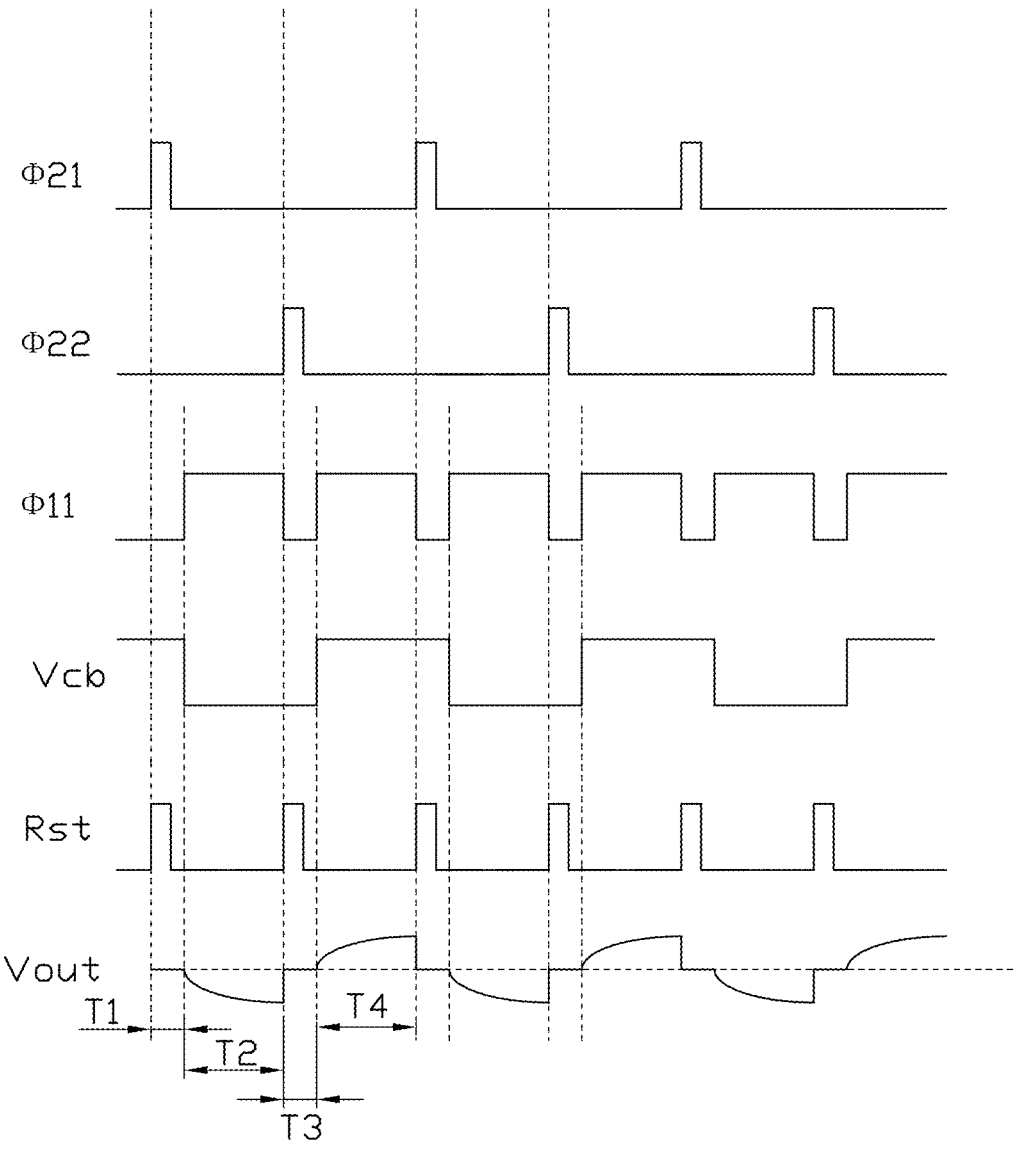
FIG. 14 is a schematic view of waveforms of the first control switch, the second control switch, the third control switch, the pulse voltage, the reset switch and the sensing voltage of FIG. 11.

Referring to FIG. 14, FIG. 14 shows the waveforms of the first control switch φ11, the second control switch φ12, the third control switch φ22, the pulse voltage Vtx, the reset switch rst, and the sensing voltage Vout.

In the first period T1, the first control switch φ11 is turned on, the second control switch φ12 and the third control switch φ22 are turned off. The buffer 21 charges the charging capacitor Cb. Meanwhile, the reset switch rst is turned on, for discharging the charge of the main capacitor Ca and the assistance capacitors C1-1~C1-p.

In the second period T2, the first control switch φ11 and the second control switch φ 12 are turned off, and the third control switch φ22 is turned on. The buffer 21 stops charging the charging capacitor Cb. The charging capacitor Cb discharges, for decreasing the effect of the self-capacitor Cfinger in related to the body capacitor Cfinger. Meanwhile, the reset switch rst is turned off, the charge on the body capacitor Cfinger is transferred to the main capacitor Ca and the assistance capacitors C1-1~C1-p. The amplifier 41 converts the charge on the body capacitor Cfinger into the voltage signal and outputs through the output terminal. Meanwhile, the sampling module 43 samples the voltage of the output terminal of the amplifier 41 and outputs the sampled voltage to the common-mode parameter adjusting module 45. The common-mode parameter adjusting module 45 calculates the shift capacitance based on the sampled voltage, the target voltage, and the capacitance of the access capacitors, and obtains the set value of the bit by table look-up, for setting the assistance capacitors to be not accessed while the shift capacitance is 0. When the shift capacitance is not 0, at least one of the assistance capacitors C1-1~C1-p is set as the common-mode capacitor. The smaller the shift capacitance is, the smaller capacitance of the common-mode capacitor set by the common-mode parameter adjusting module 45 is.

In the third period T3, the second control switch φ12 is turned on, the first control switch φ11 and the third control switch φ22 are turned off. The buffer 21 stops charging the charging capacitor Cb. The charging capacitor Cb discharges, for decreasing the effect of the self-capacitor Cfinger in related to the body capacitor Cfinger. Meanwhile, the reset switch is turned on, for allowing the shift driving module 47 to provide the first shift control signal or the second shift control signal to the common-mode capacitors, for charging the common-mode capacitors.

In the fourth period T4, the first control switch φ11 and the second control switch φ 12 are turned off, the third control switch φ22 is turned on. The buffer 21 charges the charging capacitor Cb again. Meanwhile, the reset rst is turned off. The charge stored on the common-mode capacitors are transferred to the main capacitor Ca, for adjusting the voltage of the output terminal of the amplifier 41 upwardly or downwardly.

Based on the foregoing touch circuit 200c, by setting the plurality of the assistance capacitors C1-1~C1-p connected in series and adjusting the voltage of the output terminal of the amplifier 41 in the time multiplexed manner; the output range of the voltage of the touch detection amplifying circuit 40 is maximumly used, the sensitivity and the work rate of the touch detection amplifying circuit 40 are improved. Meanwhile, the charging circuit 20 uses a capacitor circuit with switches, for decreasing the effect of the self-capacitor Cfinger in related to the body capacitor Cfinger, an application range of the touch apparatus 100 is improved.

In other embodiments, the touch circuit 200 also may use the structure of the charging circuit 20a with the charging sub-capacitors Cb-1~Cb-p in the first embodiment and the touch detection amplifying circuit 40 of the third embodiment. That is, the touch circuit 200 includes the charging circuit 20a with the charging sub-capacitors Cb-1~Cb-p (as shown in FIG. 4) and the touch detection amplifying circuit 40 (as shown in FIG. 11). The structure of the touch circuit 200 may select one of the charging circuit 20a or the touch detection amplifying circuit 40 to adjust the sensing voltage Vout based on the value of the sensing voltage Vout.

The difference in a front-end charging circuit 20 will cause an application environment of the touch circuit 200 to be different. For ensuring the sensing voltage Vout has the maximum swing width in the valid signal range of the common-mode voltage, the charging capacitor Cb is selected for correction or a feedback capacitor is selected for common-mode correction, when the charging circuit 20 in the front-end of the touch circuit 200 is configured to provide the charging current (as shown in FIG. 8) or is configured to provide the charging capacitor Cb (as shown in FIG. 4). The main capacitor Ca and the common-mode capacitor form the feedback capacitor of the touch detection amplifying circuit 40. By adjusting the capacitance of the common-mode capacitor, the capacitance of the feedback capacitor of the touch detection amplifying circuit 40 is adjusted.

While the charging circuit 20 in the front-end of the touch circuit 200 is configured to provide a charging current (as shown in FIG. 14), the front-end of the touch circuit 200 is a current structure, there is no capacitor in the charging circuit 20, or the adjustment range of the capacitance of the charging capacitor Cb is small, which is not enough to adjusting the sensing voltage Vout. Thus, the feedback capacitance is adjusted by adjusting the capacitance of the common-mode capacitor, for common-mode correcting the sensing voltage Vout.

While the charging circuit 20 in the front-end of the touch circuit 200 is configured to provide a charging capacitor, the front-end of the touch circuit 200 is a capacitor structure, the adjustment range of the capacitance of the charging capacitor Cb is large. Thus, the capacitance of the charging capacitor Cb is adjusted for common-mode correcting the sensing voltage Vout.

In at least one embodiment of the present application, the capacitance of the charging capacitor Cb is set in a first capacitance adjustment range, and there is a difference between the first capacitance adjustment range and a second capacitance adjustment range corresponding to the capacitance of the common-mode capacitor, thus the adjustment range of the feedback capacitor of the touch detection amplifying circuit 40 is smaller than the first capacitance adjustment range. A change amplitude of the sensing voltage Vout while the capacitance of the feedback capacitor changes is smaller than the change amplitude of the sensing voltage Vout while the capacitance of the charging capacitor Cb changes. Thus, by adjusting the capacitance of the charging capacitor Cb according to the sensing voltage Vout, the adjustment accuracy of the sensing voltage Vout is improved.

Based on the foregoing touch apparatus 100, the capacitance of the charging capacitor Cb in the charging circuit 20 is adjusted by the data processing circuit 50 based on the sensing voltage Vout, thus the sensing voltage Vout of the output terminal of the amplifier 41 is adjusted, the output range of the voltage of the touch detection amplifying circuit 40 is maximumly used, the sensitivity and the work rate of the touch detection amplifying circuit 40 are improved.

The foregoing described embodiments are only exemplary embodiments of this application, and are not intended to limit the scope of this application. Without departing from design spirit of this application, various transformations and improvements made by a person of ordinary skill in the art to the technical solutions of this application shall fall within the protection scope defined in claims of this application.

The invention claimed is:

1. A touch circuit, wherein the touch circuit comprises a charge generating circuit, a charging circuit, a controlling circuit, a touch detection amplifying circuit, and a data processing circuit; the charge generating circuit is configured to implement scan under a control of a specified timing for detecting sensing capacitances generated by sensing electrodes after being touched by a user; the controlling circuit is configured to control the charging circuit to charge or discharge the charge generating circuit; the touch detection amplifying circuit is electrically connected with the charging circuit and the controlling circuit; the charging circuit comprises a charging capacitor; the charging capacitor is electrically connected with the controlling circuit and the touch detection amplifying circuit through a node; the touch detection amplifying circuit is configured to convert the sensing capacitance outputted by the charge generating circuit into a sensing voltage for identifying a touch operation and a touch position; the data processing circuit is configured to output a control signal based on the sensing voltage outputted by the touch detection amplifying circuit for adjusting a capacitance of the charging capacitor, which causes the sensing voltage outputted by the touch detection amplifying circuit in a valid signal range of a common-mode voltage.

2. The touch circuit of claim 1, wherein the data processing circuit determines whether a difference between the sensing voltage and a predefined common-mode voltage is located in a predefined difference range; while the difference is besides the predefined difference range, it is determined that the capacitance of the charging capacitor needs to be corrected, the data processing circuit adjusts the capacitance of the charging capacitor according to the difference between the sensing voltage and the predefined common-mode voltage; while the difference is located in the predefined difference range, it determines that the capacitance of the charging capacitor does not need to be corrected, and the capacitance of the charging capacitor is stored.

3. The touch circuit of claim 2, wherein the capacitance of the charging capacitor changes with the sensing voltage detected by the data processing circuit in a direct proportional manner; while the difference is a positive value, the data processing circuit outputs the controlling signal for decreasing the capacitance of the charging capacitor; while the difference is a negative value, the data processing circuit outputs the controlling signal for increasing the capacitance of the charging capacitor.

4. The touch circuit of claim 1, wherein the controlling circuit comprises a first control switch, a second control switch, and a third control switch;

a terminal of the first control switch receives a power source voltage, and another terminal of the first control switch is electrically connected with the sensing electrodes; a terminal of the second control switch is grounded, and another terminal of the second control switch is electrically connected with the sensing electrodes; a terminal of the third control switch electrically connected with the sensing electrodes, and another terminal of the third control switch is electrically connected with the touch detection amplifying circuit through a node of the charging circuit.

5. The touch circuit of claim 1, wherein the touch detection amplifying circuit comprises:

an amplifier, configured to convert a sensing capacitance outputted by the charge generating circuit into a sensing voltage; a first input terminal of the amplifier is electrically connected with the charge generating circuit;

a reset switch, a terminal of the reset switch is electrically connected with the first input terminal of the amplifier, and another terminal of the reset switch is electrically connected with the output terminal of the amplifier; and a main capacitor, being connected between the first input terminal and the output terminal of the amplifier in series.

6. The touch circuit of claim 5, wherein the touch detection amplifying circuit further comprises:

a sampling module, configured to sample the voltage outputted by the amplifier and output a sampling voltage;

a plurality of assistance capacitors, a terminal of each of the plurality of the assistance capacitors is electrically connected with the first input terminal of the amplifier through a first switch component, and another terminal of each of the plurality of the assistance capacitors is electrically connected with the output terminal of the amplifier through a second switch component; while the reset switch is turned on, and there is a difference between the sampling voltage and a target voltage, at least one of the plurality of the assistance capacitors is time multiplexed as a common-mode capacitor for storing charges, while the reset switch is turned off, at least one of the plurality of the assistance capacitors adjusts the voltage of the output terminal of the amplifier; while the reset switch is turned off, the first switch component and the second switch component of the assistance capacitors are turned on, the plurality of the assistance capacitors are served as access capacitors being connected with the main capacitor in series;

a common-mode parameter adjusting module, electrically connected with the sampling module; the common-mode parameter adjusting module sets at least one of the plurality of the assistance capacitors to be time multiplexed as the common-mode capacitor by controlling at least one of the plurality of the first switch components to be turned on while there is a difference between the sampling voltage and the target voltage, and outputs a shift control signal; and a shift driving module, electrically connected with the common-mode parameter adjusting module, and electrically connected with each of the plurality of the assistance capacitors through the plurality of three switch components respectively; while the reset switch is turned on, the shift driving module is configured to control the plurality of the third switch components corresponding to the common-mode capacitors to be turned on, and charge the common-mode capacitors according to the shift control signal.

7. The touch circuit of claim 6, wherein the plurality of the assistance capacitors are coded in binary format according to an arrangement order; the capacitances of each of the plurality of the assistance capacitors are different from each other, and are arranged in geometric progression with a geometric ratio; at least one of the plurality of the assistance capacitors serves as the common-mode capacitor by setting a bit, the common-mode capacitors are selected in a manner of binary.

8. The touch circuit of claim 6, wherein the common-mode parameter adjusting module stores a look-up table; the look-up table records a relationship between different capacitances of the common-mode capacitor and different bits; the common-mode parameter adjusting module uses a difference between the sampled voltage and the target voltage as a shifted value, calculates a capacitance of the common-mode capacitor based on the shifted value and the capacitance of the access capacitors, and obtains a value of the bit corresponding to the capacitance of the common-mode capacitor by table look-up, for adjusting the number of the assistance capacitor serving as the common-mode capacitors.

9. The touch circuit of claim 1, wherein the charging capacitor comprises a plurality of charging sub-capacitors, a plurality of first switch components, and a plurality of second switch components; a terminal of each of the plurality of the charging sub-capacitors is electrically connected with the node through one of the plurality of the first switch components, another terminal of each of the plurality of the charging sub-capacitors receives a pulse voltage through one of the plurality of the second switch components; the charging sub-capacitors are coded in binary format according to an arrangement order; capacitances of the charging sub-capacitors are different from each other, and are arranged in geometric progression with a geometric ratio; at least one of the plurality of the charging sub-capacitors is selected as the charging capacitor by setting a bit, for adjusting the capacitance of the charging capacitor in a manner of binary format.

10. The touch circuit of claim 1, wherein charging capacitor comprises a plurality of charging sub-capacitors, a plurality of first switch components, and a plurality of second switch components; a terminal of each of the plurality of the charging sub-capacitors is electrically connected with the node through one of the plurality of the first switch components, another terminal of each of the plurality of the charging sub-capacitors receives a pulse voltage through one of the plurality of the second switch components; the charging sub-capacitors are coded in one-hot code format; capacitances of the charging sub-capacitors are the same.

11. The touch circuit of claim 1, wherein in each operation period, the touch apparatus operates in a positive half-period and a negative half-period in that order; in the positive half-period, the data processing circuit controls the capacitance of the charging capacitor to be maintained at a predefined capacitance; in the negative half-period, the data processing circuit controls the capacitance of the charging capacitor to be adjusted according to the sensing voltage.

12. The touch circuit of claim 11, wherein the positive half-period comprises a first period and a second period; in the first period, the controlling circuit controls the charge generating circuit and the touch detection amplifying circuit to be reset; in the second period, the controlling circuit controls the charging circuit to discharge for charging a self-capacitor in the charge generating circuit; the negative half-period comprise a third period and a fourth period; in the third period, the controlling circuit provides a power source voltage to charge the charge generating circuit, and controls the touch detection amplifying circuit to discharge; in the fourth period, the controlling circuit controls the charge generating circuit to discharge, for transferring the charge stored in a body capacitor of the charge generating circuit to the touch detection amplifying circuit.

13. The touch circuit of claim 12, wherein charging circuit comprise a buffer; the buffer provides a received pulse voltage to the charging capacitor; in the second period and the third period, the buffer provides the power source voltage to the charging capacitor; in the first period and the fourth period, the buffer provides a ground voltage to the charging capacitor.

14. A touch detection amplifying circuit, electrically connected with a charge generating circuit; wherein the touch detection amplifying circuit comprises:

an amplifier, configured to convert a sensing capacitance outputted by the charge generating circuit into a sensing voltage; a first input terminal of the amplifier is electrically connected with the charge generating circuit;

a sampling module, configured to sample the voltage outputted by the amplifier and output a sampling voltage;

a reset switch, a terminal of the reset switch is electrically connected with the first input terminal of the amplifier, and another terminal of the reset switch is electrically connected with the output terminal of the amplifier;

a main capacitor, being connected between the first input terminal and the output terminal of the amplifier in series;

a plurality of assistance capacitors, a terminal of each of the plurality of the assistance capacitors is electrically connected with the first input terminal of the amplifier through a first switch component, and another terminal of each of the plurality of the assistance capacitors is electrically connected with the output terminal of the amplifier through a second switch component; while the reset switch is turned on, and there is a difference between the sampling voltage and a target voltage, at least one of the plurality of the assistance capacitors is time multiplexed as a common-mode capacitor for storing charges, while the reset switch is turned off, at least one of the plurality of the assistance capacitors adjusts the voltage of the output terminal of the amplifier; while the reset switch is turned off, the first switch component and the second switch component of the assistance capacitors are turned on, the plurality of the assistance capacitors are served as access capacitors being connected with the main capacitor in series;

a common-mode parameter adjusting module, electrically connected with the sampling module; the common-mode parameter adjusting module sets at least one of the plurality of the assistance capacitors to be time multiplexed as the common-mode capacitor by controlling at least one of the plurality of the first switch components to be turned on while there is a difference between the sampling voltage and the target voltage, and outputs a shift control signal; and a shift driving module, electrically connected with the common-mode parameter adjusting module, and electrically connected with each of the plurality of the assistance capacitors through the plurality of three switch components respectively; while the reset switch is turned on, the shift driving module is configured to control the plurality of the third switch components corresponding to the common-mode capacitors to be turned on, and charge the common-mode capacitors according to the shift control signal.

15. The touch detection amplifying circuit of claim 14, wherein the plurality of the assistance capacitors are coded in binary format according to an arrangement order; the capacitances of each of the plurality of the assistance capacitors are different from each other, and are arranged in geometric progression with a geometric ratio; at least one of the plurality of the assistance capacitors serves as the common-mode capacitor by setting a bit, the common-mode capacitors are selected in a manner of binary.

16. The touch detection amplifying circuit of claim 15, wherein the common-mode parameter adjusting module stores a look-up table; the look-up table records a relationship between different capacitances of the common-mode capacitor and different bits; the common-mode parameter adjusting module uses a difference between the sampled voltage and the target voltage as a shifted value, calculates a capacitance of the common-mode capacitor based on the shifted value and the capacitance of the access capacitors, and obtains a value of the bit corresponding to the capacitance of the common-mode capacitor by table look-up, for adjusting the number of the assistance capacitor serving as the common-mode capacitors.

17. The touch detection amplifying circuit of claim 16, wherein the capacitance of the common-mode voltage is calculated by a formular, which is $Cp=Vdiff/Vt*Cfb$; wherein Cp represents the capacitance of the common-mode capacitor, Vdiff represents the difference between the sampled voltage and the target voltage, Cfb represents a sum of the capacitance of the access capacitors.

18. The touch detection amplifying circuit of claim 14, wherein the common-mode parameter adjusting module further compares the sampled voltage and the target voltage and outputs a shift control signal based on a comparison result, for confirming a shifting direction; while the sampled voltage is larger than the target voltage, the common-mode parameter adjusting module outputs a first shift control signal, for adjusting the voltage of the amplifier downwardly; while the sampled voltage is less than the target voltage, the common-mode parameter adjusting module outputs a second shift control signal, for shifting the voltage of the output terminal of the amplifier upwardly.

19. The touch detection amplifying circuit of claim 18, wherein the first shift control signal is a ground voltage, the second shift control signal is the power source voltage.

20. The touch detection amplifying circuit of claim 18, wherein the first shift control signal and the second shift control signal are pulse signals of same frequency and opposite in phase; the first shift control signal and the controlling signal of the reset switch are pulse signals of same frequency and same phase; the second controlling signal and the controlling signal of the reset switch are pulse signals of same frequency and opposite in phase.

21. The touch detection amplifying circuit of claim 14, wherein the plurality of the assistance capacitors is coded in one-hot code format; the capacitance of each of the plurality of the assistance capacitors is the same; by controlling a number of the at least one of the third switch components being turned on, a number of the plurality of the assistance capacitors served as the common-mode capacitors are selected.

22. A touch apparatus, wherein the touch apparatus comprises the touch circuit; the touch circuit comprises a charge generating circuit, a charging circuit, a controlling circuit, a touch detection amplifying circuit, and a data processing circuit; the charge generating circuit is configured to implement scan under a control of a specified timing for detecting sensing capacitances generated by sensing electrodes after being touched by a user; the controlling circuit is configured to control the charging circuit to charge or discharge the charge generating circuit; the touch detection amplifying circuit is electrically connected with the charging circuit and the controlling circuit; the charging circuit comprises a charging capacitor; the charging capacitor is electrically connected with the controlling circuit and the touch detection amplifying circuit through a node; the touch detection amplifying circuit is configured to convert the sensing capacitance outputted by the charge generating circuit into a sensing voltage for identifying a touch operation and a touch position; the data processing circuit is configured to output a control signal based on the sensing voltage outputted by the touch detection amplifying circuit for adjusting a capacitance of the charging capacitor, which causes the sensing voltage outputted by the touch detection amplifying circuit in a valid signal range of a common-mode voltage.

23. A touch apparatus, wherein the touch apparatus comprises a charge generating circuit, a charging circuit, a controlling circuit, a touch detection amplifying circuit, and a data processing circuit; the charge generating circuit is configured to implement scan under a control of a specified timing for detecting a sensing capacitance generated by sensing electrodes after being touched by a user; the controlling circuit is configured to control the charging circuit to charge the charge generating circuit, for decreasing an effect of a self-capacitor in the charging circuit in related to a sensing voltage outputted by the touch detection amplifying circuit, the touch apparatus comprises the touch detection amplifying circuit; wherein the touch detection amplifying circuit, electrically connected with a charge generating circuit; wherein the touch detection amplifying circuit comprises:

an amplifier, configured to convert a sensing capacitance outputted by the charge generating circuit into a sensing voltage; a first input terminal of the amplifier is electrically connected with the charge generating circuit;

a sampling module, configured to sample the voltage outputted by the amplifier and output a sampling voltage;

a reset switch, a terminal of the reset switch is electrically connected with the first input terminal of the amplifier, and another terminal of the reset switch is electrically connected with the output terminal of the amplifier;

a main capacitor, being connected between the first input terminal and the output terminal of the amplifier in series;

a plurality of assistance capacitors, a terminal of each of the plurality of the assistance capacitors is electrically connected with the first input terminal of the amplifier through a first switch component, and another terminal of each of the plurality of the assistance capacitors is electrically connected with the output terminal of the amplifier through a second switch component; while the reset switch is turned on, and there is a difference between the sampling voltage and a target voltage, at least one of the plurality of the assistance capacitors is time multiplexed as a common-mode capacitor for storing charges, while the reset switch is turned off, at least one of the plurality of the assistance capacitors adjusts the voltage of the output terminal of the amplifier; while the reset switch is turned off, the first switch component and the second switch component of the assistance capacitors are turned on, the plurality of the assistance capacitors are served as access capacitors being connected with the main capacitor in series;

a common-mode parameter adjusting module, electrically connected with the sampling module; the common-mode parameter adjusting module sets at least one of the plurality of the assistance capacitors to be time multiplexed as the common-mode capacitor by controlling at least one of the plurality of the first switch components to be turned on while there is a difference between the sampling voltage and the target voltage, and outputs a shift control signal; and a shift driving module, electrically connected with the common-mode parameter adjusting module, and electrically connected with each of the plurality of the assistance capacitors through the plurality of three switch components respectively; while the reset switch is turned on, the shift driving module is configured to control the plurality of the third switch components corresponding to the common-mode capacitors to be turned on, and charge the common-mode capacitors according to the shift control signal.

24. The touch apparatus of claim 23, wherein the charging circuit comprises a first current source and a second current source; the first current source provides a first charging current for charging a self-capacitor in the charge generating circuit, the second current source provides a second charging current for charging the self-capacitor in the charge generating circuit.

25. The touch apparatus of claim 23, wherein the charging circuit comprises a charging capacitor and a buffer; the buffer is electrically connected with the controlling circuit through the charging capacitor; the buffer is configured to provide a pulse voltage.

26. The touch apparatus of claim 23, wherein the controlling circuit comprises a first control switch, a second control switch, and a third control switch; a terminal of the first control switch receives a power source voltage, and another terminal of the first control switch is electrically connected with the sensing electrodes; a terminal of the second control switch is grounded, and another terminal of the second control switch is electrically connected with the sensing electrodes; a terminal of the third control switch is electrically connected with the sensing electrodes, and another terminal of the third control switch is electrically connected with the touch detection amplifying circuit through a node of the charging circuit.

* * * * *